(12) United States Patent
Chen

(10) Patent No.: US 9,250,054 B2
(45) Date of Patent: Feb. 2, 2016

(54) POSITIONING DEVICE AND POSITIONING METHOD

(71) Applicant: AOPEN INC., New Taipei (TW)

(72) Inventor: Chih Hsiung Chen, New Taipei (TW)

(73) Assignee: Aopen, Inc., New Taipei (TW)

(*) Notice: Subject to any disclaimer, the term of this patent is extended or adjusted under 35 U.S.C. 154(b) by 307 days.

(21) Appl. No.: 14/018,568

(22) Filed: Sep. 5, 2013

(65) Prior Publication Data

US 2014/0096404 A1 Apr. 10, 2014

(30) Foreign Application Priority Data

Oct. 5, 2012 (TW) ................. 101136903 A

(51) Int. Cl.
*G01B 5/14* (2006.01)
*F16M 13/02* (2006.01)
*E04F 21/18* (2006.01)

(52) U.S. Cl.
CPC .............. *G01B 5/14* (2013.01); *E04F 21/1844* (2013.01); *F16M 13/02* (2013.01)

(58) Field of Classification Search
CPC .................................. G01D 21/00; G01B 5/14
USPC ............................ 33/613, 645, 562, 563, 566
See application file for complete search history.

(56) References Cited

U.S. PATENT DOCUMENTS

| | | | | |
|---|---|---|---|---|
| 5,451,027 A * | 9/1995 | McHenry | ................ | A47G 1/205 33/613 |
| 6,880,259 B1 * | 4/2005 | Schultz | .................... | G01C 9/28 33/1 G |
| 7,421,796 B1 * | 9/2008 | DeAngelis-Morris | . | A47G 1/205 33/1 B |
| 2003/0154614 A1 * | 8/2003 | Rice | ........................ | A47G 1/205 33/613 |
| 2010/0011602 A1 * | 1/2010 | Houssian | ............... | A47G 1/205 33/613 |

FOREIGN PATENT DOCUMENTS

CN 201083943 Y 7/2008

OTHER PUBLICATIONS

Office Action issued Apr. 20, 2015 from Chinese counterpart patent application No. 201210417374.4; five pages.
Abridged English translation of sections boxed in red in Office Action issued Apr. 20, 2015 to Chinese counterpart patent application No. 201210417374.4; two pages.
English translation of cited reference CN 201083943Y; three pages.

* cited by examiner

*Primary Examiner* — Yaritza Guadalupe-McCall
(74) *Attorney, Agent, or Firm* — John A. Fortkort; Fortkort & Houston P.C.

(57) ABSTRACT

A positioning device is adapted to mark an assembly position of a wall mount on a wall surface. The wall mount is formed with a plurality of through holes. The positioning device includes a wall mount reference diagram and a level tool. The wall mount reference diagram can be brought against the wall surface, and is provided with a plurality of position indications, which are spaced apart from each other, and which respectively correspond in position to the through holes in the wall mount. The level tool is disposed on the wall mount reference diagram, and is configured to assist in correcting leveling of the position indications of the wall mount reference diagram.

17 Claims, 17 Drawing Sheets

POSITIONING DEVICE AND POSITIONING METHOD

CROSS-REFERENCE TO RELATED APPLICATION

This application claims priority of Taiwanese Patent Application No. 101136903, filed on Oct. 5, 2012, the disclosure of which is incorporated herein by reference.

BACKGROUND OF THE INVENTION

1. Field of the Invention

The invention relates to a positioning device and a positioning method, and more particularly to a positioning device and a positioning method used for assisting in marking an assembly position of a wall mount on a wall surface.

2. Description of the Related Art

When it is intended to hang an existing flat panel display on a wall surface, typically a wall mount is fixed to the wall surface with screws, and then the flat panel display is assembled with and fixed to the wall mount, so that the flat panel display is hung on the wall surface through the wall mount. During assembly, because the wall mount is fixed to the wall surface prior to assembly with the flat panel display, an error in the assembly position of the wall mount results in an error in the hanging position of the flat panel display.

In addition, when it is intended to join together a plurality of flat panel displays to form a video wall as a whole, relevant dimensions of the flat panel di splays and the respective wall mounts, as well as relevant dimensions such as distances between adjacent ones of the wall mounts assembled to the wall surface, must be measured first to ensure that the flat panel displays will not collide after being assembled with and fixed to the respective wall mounts. As a result, the entire assembly process is very complicated and inconvenient, and consumes a large number of man-hours. Further, the overall configuration of the video wall and the effect presented thereby cannot be previewed beforehand. Thus, it is probable that the assembled video wall needs be reworked because the configuration and the effect presented thereby fail to meet requirements.

SUMMARY OF THE INVENTION

An object of the present invention is to provide a positioning device for marking an assembly position of a wall mount on a wall surface.

According to one aspect of the present invention, there is provided a positioning device that is adapted to mark an assembly position of a wall mount on a wall surface. The wall mount is formed with a plurality of through holes. The positioning device includes a wall mount reference diagram and a level tool.

The wall mount reference diagram can be brought against the wall surface, and is provided with a plurality of position indications, which are spaced apart from each other, and which respectively correspond in position to the through holes in the wall mount.

The level tool is disposed on the wall mount reference diagram, and is configured to assist in correcting leveling of the position indications of the wall mount reference diagram.

Another object of the present invention is to provide a positioning device for determining in advance an assembly position of a wall mount on a wall surface.

According to another aspect of the present invention, there is provided a positioning method for determining in advance an assembly position of a wall mount on a wall surface. The wall mount is configured to be assembled with a flat panel. The positioning method includes the steps of: (A) adjusting positions of a wall mount reference diagram and an alignment reference diagram that is connected to the wall mount reference diagram by referring to a level tool so that a plurality of position indications of the wall mount reference diagram are leveled, the position indications respectively corresponding in position to a plurality of through holes in the wall mount, the alignment reference diagram being identical in shape and size to the flat panel; (B) fixing the alignment reference diagram to the wall surface; and (C) drilling holes into the wall surface at locations respectively corresponding to the position indications, the holes indicating where the through holes of the wall mount are to be aligned when the wall mount is mounted to the wall surface.

Another object of the present invention is to provide a positioning method which is capable of determining in advance assembly positions of a plurality of wall mounts on a wall surface.

According to yet another aspect of the present invention, there is provided a positioning method for determining assembly positions of a plurality of wall mounts on a wall surface in advance by using a plurality of positioning devices. Each of the wall mounts is configured to be assembled with a respective flat panel. Each of the positioning devices includes a wall mount reference diagram, an alignment reference diagram that is connected to the wall mount reference diagram, and a level tool that is disposed on the wall mount reference diagram. The positioning method includes the steps of: (A) arranging the alignment reference diagrams of the positioning devices on the wall surface to form a required configuration as a whole, and adjusting a position of the wall mount reference diagram of each of the positioning devices with reference to the level tool of the positioning device such that a plurality of position indications of the wall mount reference diagram are leveled, the position indications corresponding respectively in position to a plurality of through holes in the wall mount, the alignment reference diagram of each of the positioning devices being identical in shape and size to the respective flat panel that is to be assembled with a corresponding one of the wall mounts; (B) fixing the positioning devices to the wall surface; and (C) drilling holes into the wall surface at positions that respectively correspond to the position indications, the holes indicating where the through holes of the wall mounts are to be aligned when the wall mounts are mounted to the wall surface.

BRIEF DESCRIPTION OF THE DRAWINGS

Other features and advantages of the present invention will become apparent in the following detailed description of three embodiments with reference to the accompanying drawings, of which.

DETAILED DESCRIPTION OF THE EMBODIMENTS

The above-mentioned and other technical contents, features, and effects of this invention will be clearly presented from the following detailed description of the three embodiments in coordination with the reference drawings. With the description of the specific embodiments, the technical solutions adapted by the present invention for achieving the objects and effects may be more thoroughly and specifically understood. However, the appended figures are merely provided for reference and illustration, without any intention to be used to limit the present invention.

Figure 1:
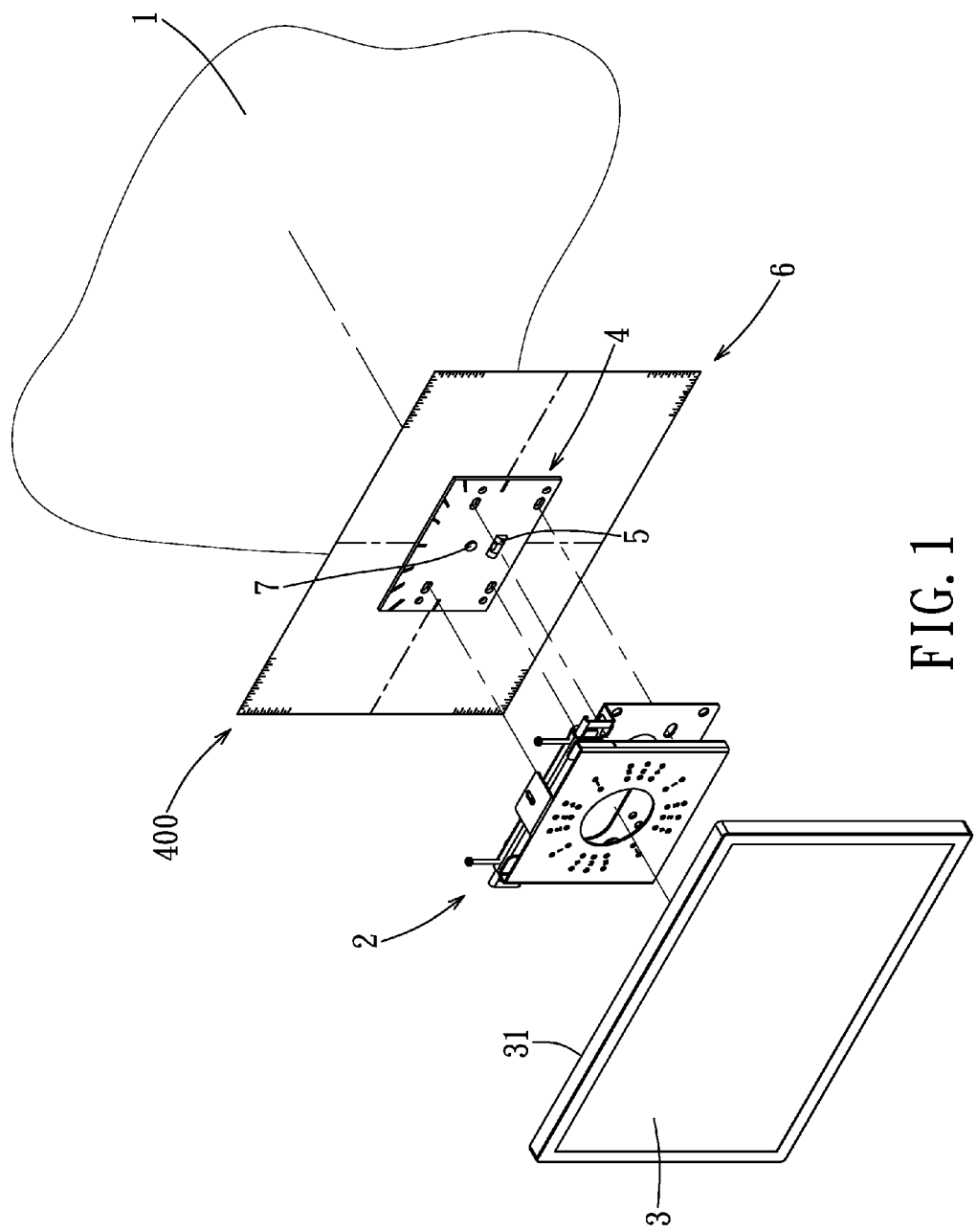
FIG. 1 is an exploded perspective view of a positioning device according to the first embodiment of the present invention, along with a wall surface, a wall mount and a flat panel display.

FIG. 1 shows a positioning device according to a first embodiment of the present invention. The positioning device 400 is used to mark in advance an assembly position of a wall mount 2 on a wall surface 1. In this embodiment, the wall surface 1 is exemplified as a wall surface of a building wall. The wall mount 2 may be configured to mount a flat panel display 3, such as a liquid crystal display or a plasma display. The flat panel display 3 may be hung on the wall surface 1 through the wall mount 2. It should be noted that the wall mount 2 may also be configured to mount a glass plate or a decorative plate for decorating the appearance of a building or an LED display billboard.

As shown in FIGS. 1, 2, 3 and 4, the wall mount 2 includes a wall-mounting frame 21 and a supporting frame 22 detachably assembled with the wall-mounting frame 21. The supporting frame 22 is configured to have a rear surface 31 of the flat panel display 3 mounted thereto. The wall-mounting frame 21 is formed with a plurality of through holes 211 that are spaced apart from each other, and that permit a plurality of locking fasteners 23 to extend respectively therethrough so as to secure the wall-mounting frame 21 to the wall surface 1. The positioning device 400 includes a wall mount reference diagram 4 and a level tool 5, such as a spirit level. The wall mount reference diagram 4 may be attached to the wall surface 1, and is formed with a plurality of position indications 41 that are spaced apart from each other and that correspond respectively in position to the through holes 211 of the wall-mounting frame 21. The level tool 5 is disposed on the wall mount reference diagram 4 to assist in leveling the position indications 41.

Figure 11:
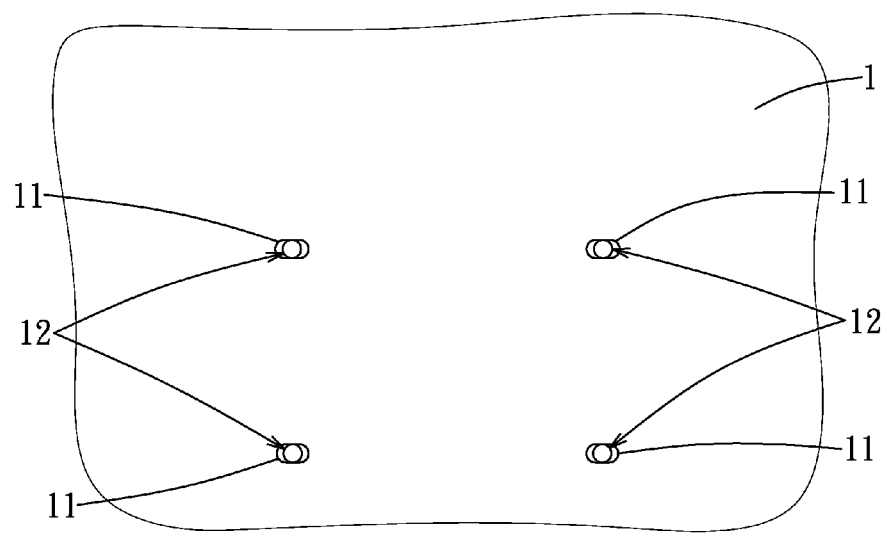
FIG. 11 is a front view of the wall surface, illustrating that the wall surface is marked with position markings, and is drilled with fastening holes at locations corresponding to the position markings.
Figure 12:
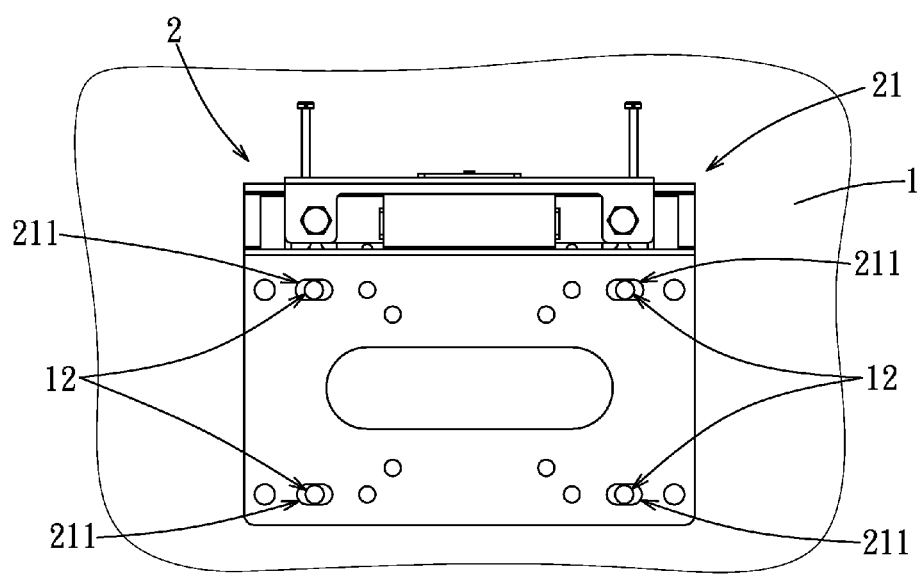
FIG. 12 is a front view of the wall surface, illustrating that the wall-mounting frame is attached to the wall surface with through holes of the wall-mounting frame aligned with the fastening holes in the wall surface.
Figure 13:
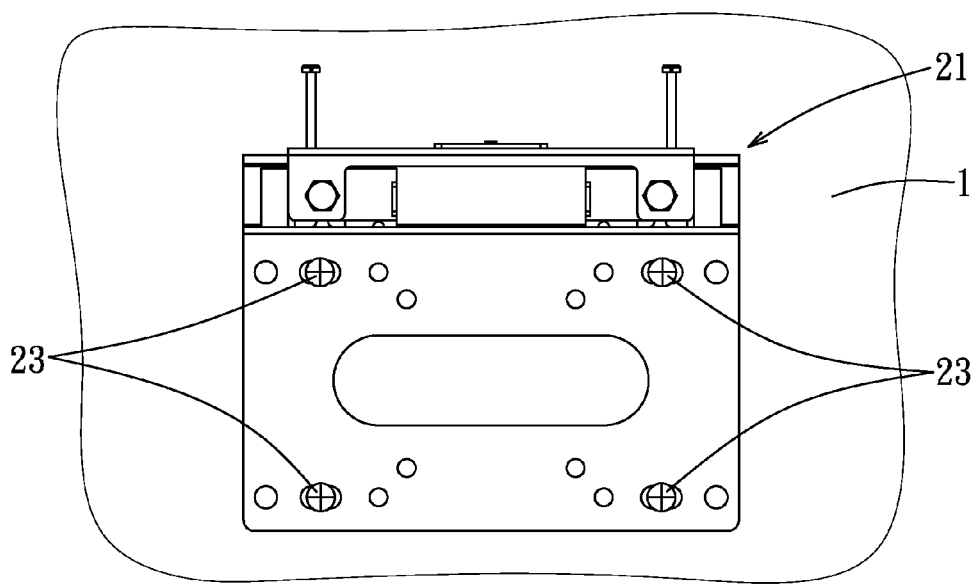
FIG. 13 is a front view of the wall surface, illustrating that the wall-mounting frame is secured to the wall surface with locking fasteners.
Figure 14:
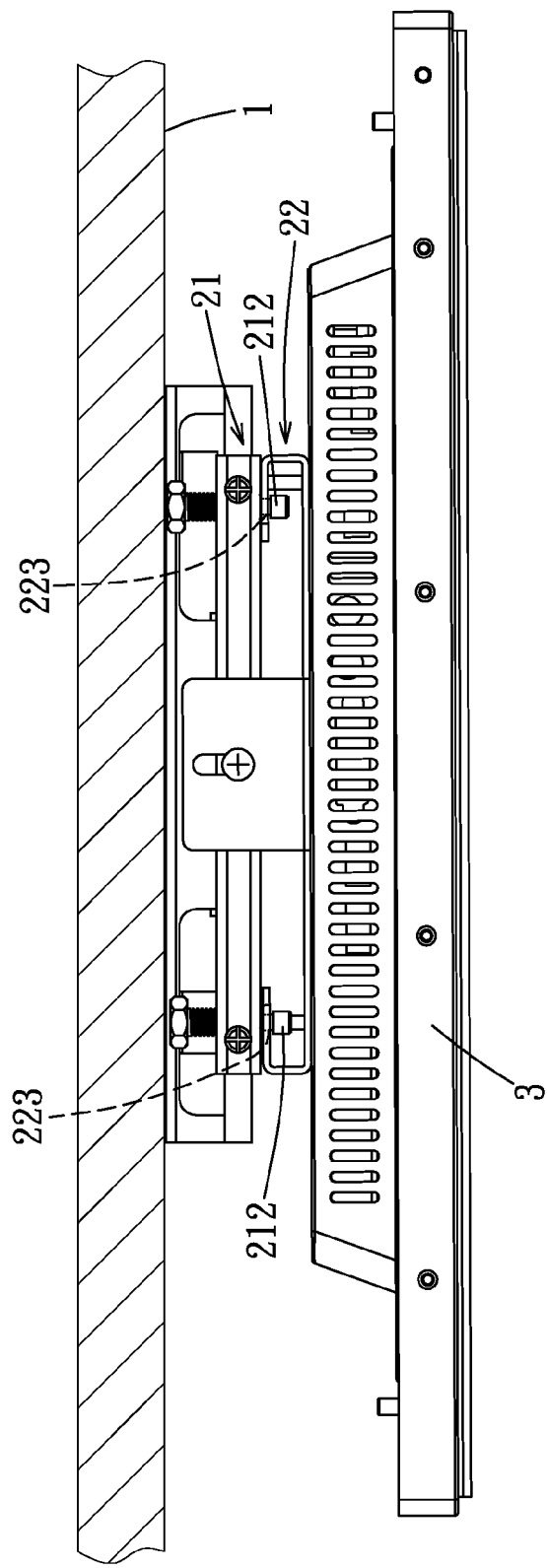
FIG. 14 is a schematic top view, illustrating that the flat panel display is hung on the wall surface through the wall mount.

The position indications 41 of the wall mount reference diagram 4 facilitates marking of a plurality of position markings 11 (as shown in FIG. 11) on the wall surface 1. Subsequently, after removing the wall mount reference diagram 4 from the wall surface 1, a drilling machine (not shown) may be used to drill holes in the wall surface 1 at positions that are marked with the position markings 11, thereby forming a plurality of fastening holes 12 (as shown in FIG. 11) in the wall surface 1. The wall mount 2 may then be fixed to the wall surface 1 by extending the locking fasteners 23 respectively through the through holes 211 of the wall-mounting frame 21 and screwing the locking fasteners 23 respectively into the fastening holes 12. Details on the above process will be provided later. By using the positioning device 400 to mark out in advance the assembly position of the wall mount 2 on the wall surface 1, the wall mount 2 may be quickly and accurately assembled and fixed to the wall surface 1, thereby preventing positioning offsets of the assembled wall mount 2 and flat panel display 3 from that desired.

The specific structure of the positioning device 400 will be described in detail below.

As shown in FIGS. 1, 2, 3 and 4, in this embodiment, the wall mount reference diagram 4 has a front side 42 and a rear side 43. Each of the position indications 41 is a through hole extending through the front side 42 and the rear side 43, and identical in shape to the through holes 211 of the wall-mounting frame 21. The level tool 5 is fixed to the front side 42 of the wall mount reference diagram 4 with, for example, an adhesive.

The positioning device 400 further includes an alignment reference diagram 6. The alignment reference diagram 6 is connected to the wall mount reference diagram 4 and is located behind the rear side 43 of the wall mount reference diagram 4. The shape and size of the alignment reference diagram 6 can be made the same as those of the flat panel display 3 to be assembled with the wall mount 2. Since the size of the alignment reference diagram 6 is greater than that of the wall mount reference diagram 4, when looking from the front side 42 of the wall mount reference diagram 4, outer portions of the alignment reference diagram 6 can be seen as they are exposed outside an outer edge 44 of the wall mount reference diagram 4 and not covered by the wall mount reference diagram 4. Because the shape and size of the alignment reference diagram 6 are the same as those of the flat panel display 3, and the outer portions of the alignment reference diagram 6 are exposed outside the outer edge 44 of the wall mount reference diagram 4, when the wall mount reference diagram 4 and the alignment reference diagram 6 are brought against the wall surface 1, a user may preview the position of the flat panel display 3 on the wall surface 1 after assembly by viewing the alignment reference diagram 6, thereby being able to determine whether the assembly position of the wall mount 2 meets the user's requirements or whether adjustments are needed.

In this embodiment, the wall mount reference diagram 4 and the alignment reference diagram 6 are each apiece of drawing paper. Therefore, the user may fold the wall mount reference diagram 4 and the alignment reference diagram 6 to reduce the overall volume of the positioning device 400, thereby facilitating storage and carrying. Further, the fabrication with paper materials may also reduce the manufacturing cost of the positioning device 400. Certainly, in design, the wall mount reference diagram 4 and the alignment reference diagram 6 may also each be a drawing board. the drawing board is a thin flexible board, so that the user may fold the wall mount reference diagram 4 and the alignment reference diagram 6.

Figure 3:
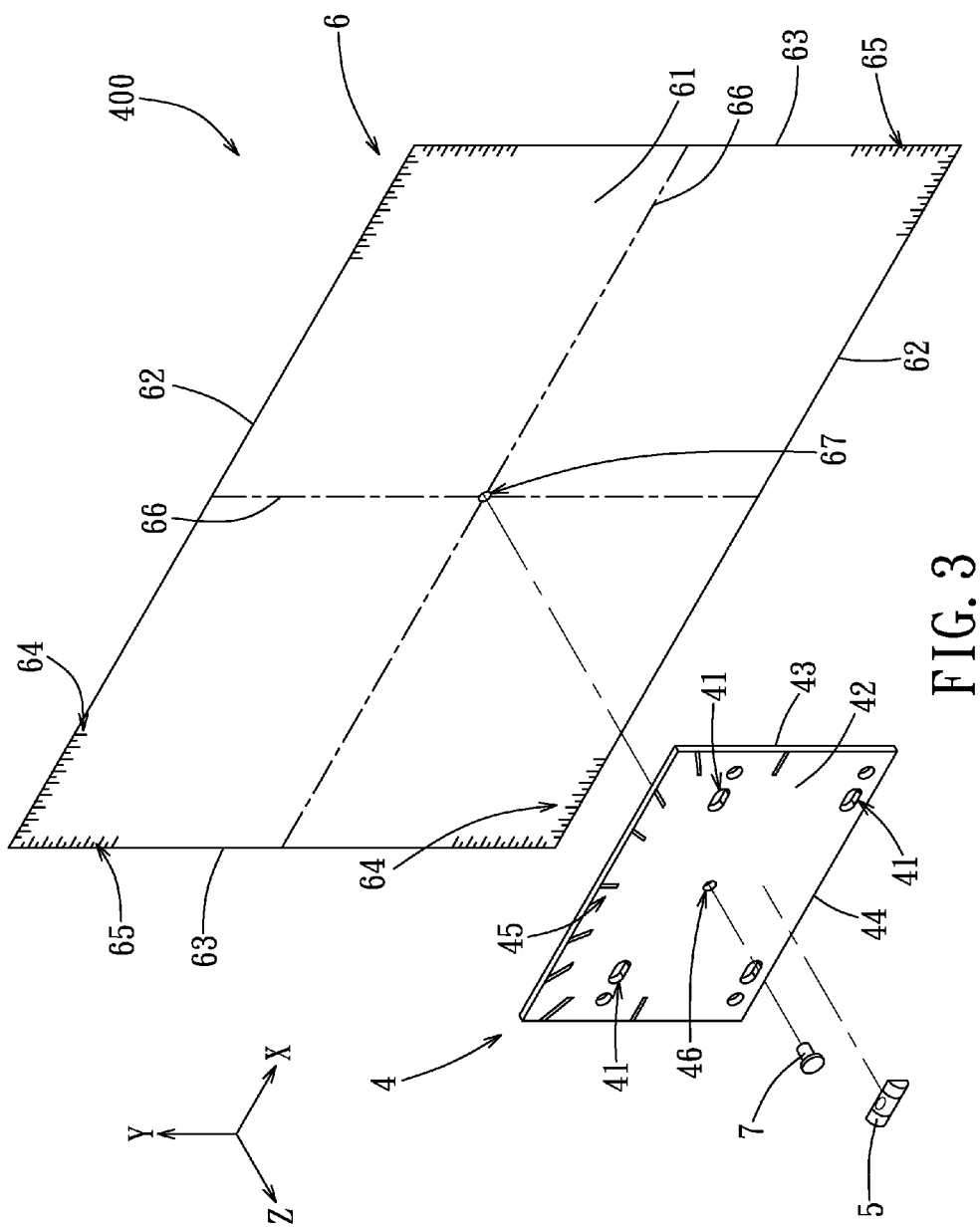
FIG. 3 is an exploded perspective view of the positioning device, illustrating assembly relationships among a wall mount reference diagram, a level tool, an alignment reference diagram and a pivot axle.
Figure 4:
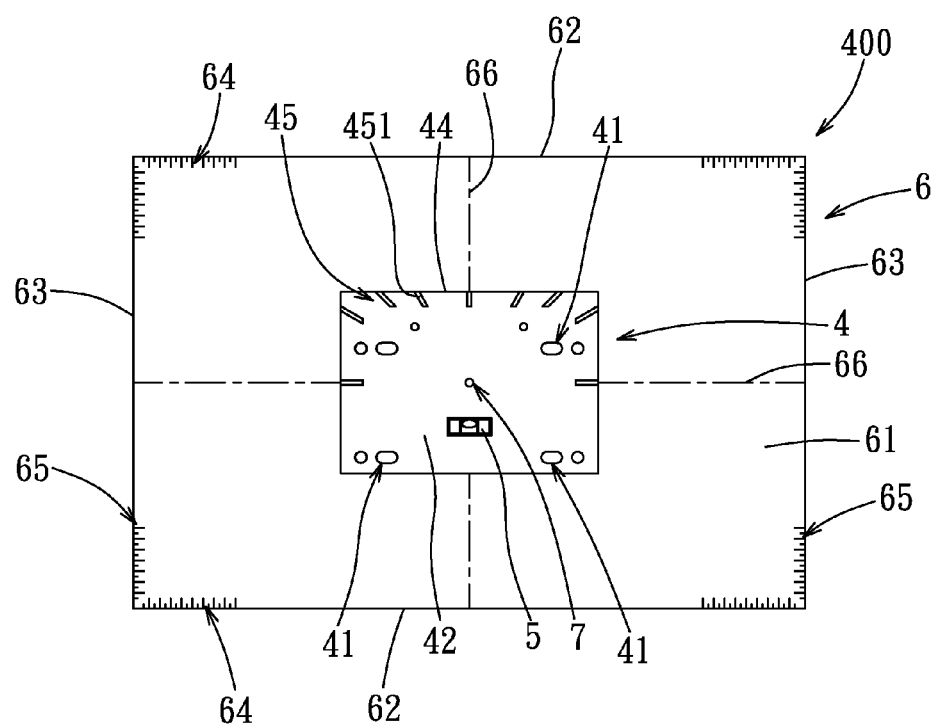
FIG. 4 is a front view of the positioning device.
Figure 5:
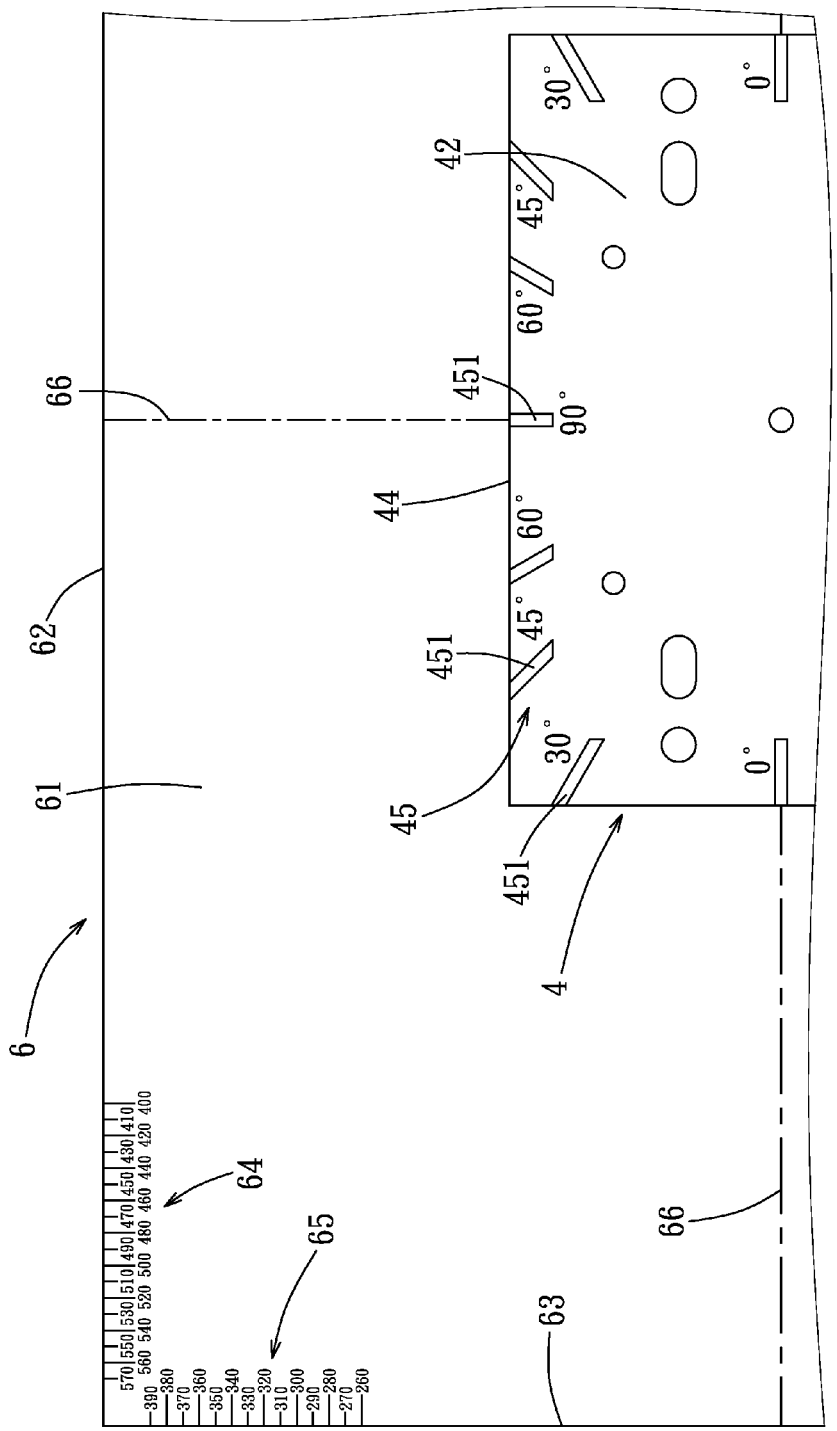
FIG. 5 is a fragmentary enlarged view of FIG. 4.

As shown in FIGS. 3, 4 and 5, more specifically, the alignment reference diagram 6 is rectangular in shape, has a front surface 61, two opposite long sides 62, two opposite short sides 63 located on sides and each interconnecting corresponding ends of the two long sides 62, two length scales 64, and two width scales 65. Each of the length scales 64 is marked on the front surface 61 and is arranged along an extension direction of a corresponding one of the long sides 62. Each of the width scales 65 is marked on the front surface 61 and is arranged along an extension direction of a corresponding one of the short sides 63. Each of the long sides 62 extends along an X-axis direction, and each of the short sides 63 extends along a Y-axis direction. Because the alignment reference diagram 6 is a piece of drawing paper, and the front surface 61 of the alignment reference diagram 6 is marked with the length scales 64 and the width scales 65, the user may conveniently and quickly cut the alignment reference diagram 6 into a size having a length and a width matching those of the flat panel display 3. As such, when the wall mount reference diagram 4 and the alignment reference diagram 6 are brought against the wall surface 1, the user may view in advance the actual area occupied by the flat panel display 3 on the wall surface 1 after assembly by viewing the alignment reference diagram 6 cut into the same size as that of the flat panel display 3, so as to determine whether the flat panel display 3 is suitable for the application, or whether a flat panel display 3 of a different size should be used instead. It should be noted that, in design, there may be only one length scale 64 and only one width scale 65, and the present invention is not limited to the numbers of these elements.

Figure 2:
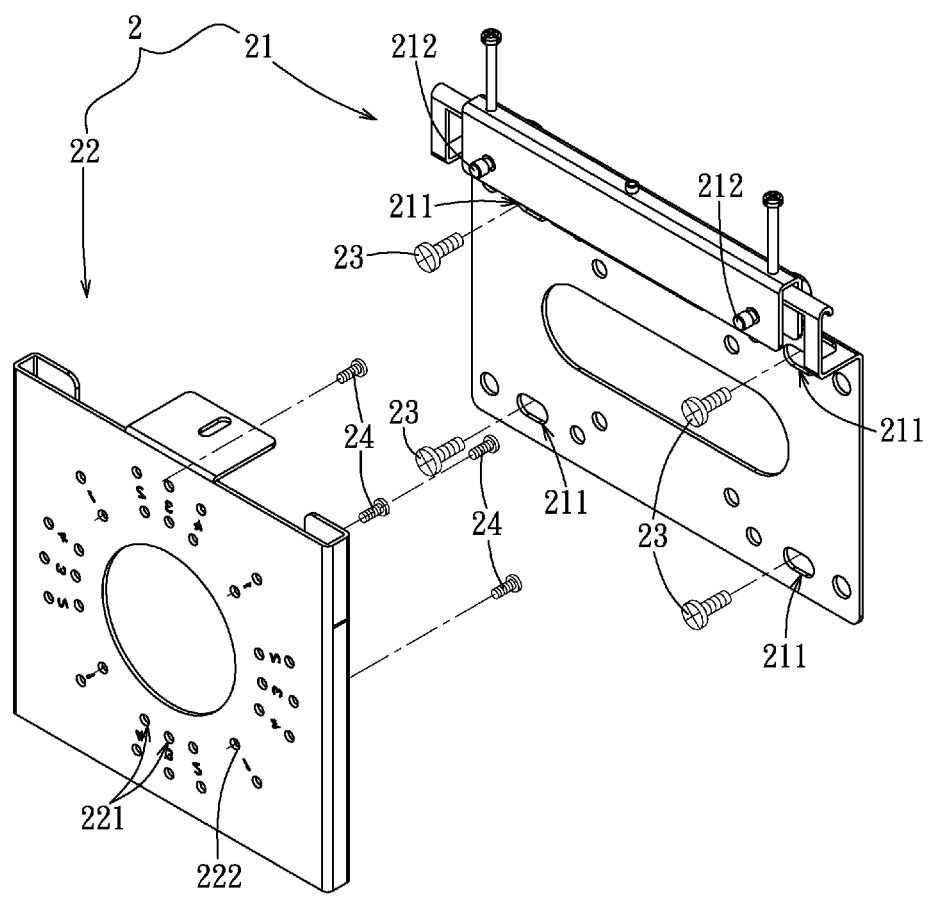
FIG. 2 is an exploded perspective view of the wall mount, illustrating that the wall mount includes a wall-mounting frame and a supporting frame.
Figure 6:
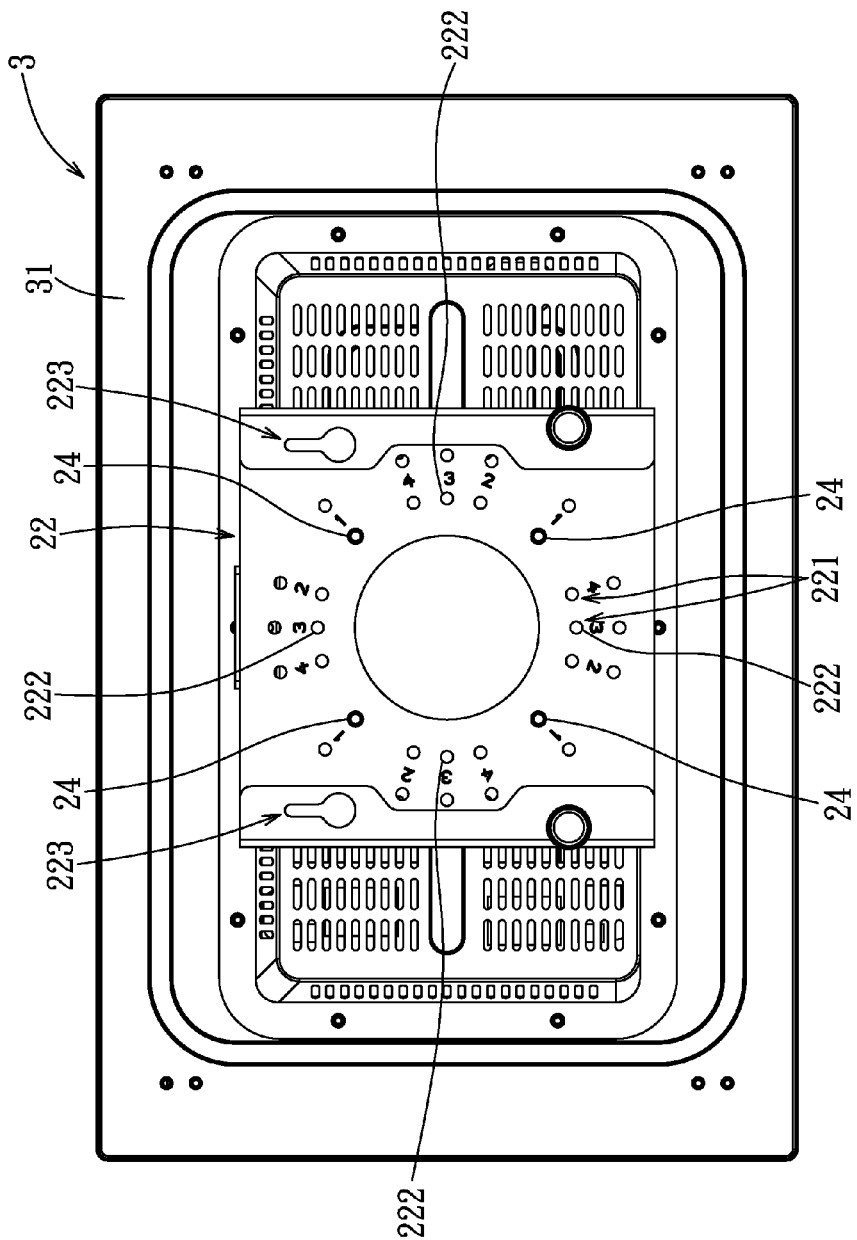
FIG. 6 is a rear view of the supporting frame of the wall mount when assembled with the flat panel display, illustrating that the supporting frame includes a plurality of engaging units respectively located at different angular positions.
Figure 7:
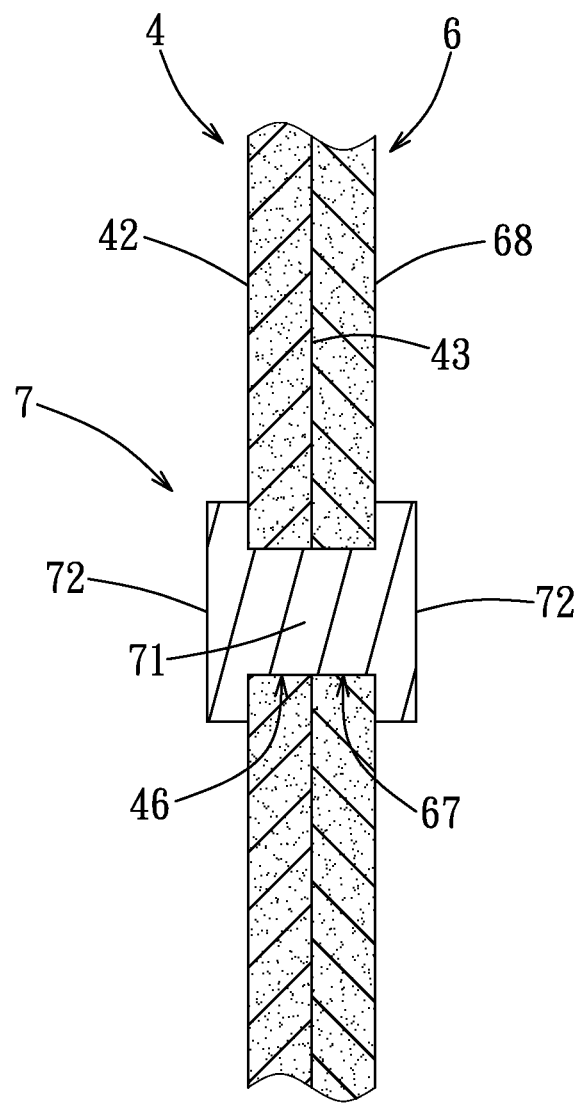
FIG. 7 is a fragmentary sectional view of the positioning device, illustrating that the pivot axle connects the wall mount reference diagram and the alignment reference diagram.

As shown in FIGS. 2 and 6, the supporting frame 22 of the wall mount 2 is formed with a plurality of engaging units 221. Each of the engaging units 221 includes a plurality of engaging holes 222 spaced apart from each other. The engaging holes 222 are through holes meeting the VESA specifications. In this embodiment, the engaging holes 222 of the engaging units 221 are arranged in a circle and are angularly spaced apart with each engaging unit 221 including four engaging holes 222 that are respectively located at four vertices of a corresponding square. The engaging holes 222 of each engaging unit 221 may correspond in position to a plurality of positioning screw holes (not shown) in the rear surface 31 of the flat panel display 3. By using a plurality of locking fasteners 24 to extend respectively through the engaging holes 222 of one of the engaging units 221 and screwed respectively into the positioning screw holes of the flat panel display 3, the flat panel display 3 and the supporting frame 22 may be secured together. Through the design of the multiple engaging units 221 respectively at different angular positions, the user may choose to secure the flat panel display 3 to the engaging holes 222 of a particular one of the engaging units 221, so that the flat panel display 3 is secured at the angular orientation corresponding to the chosen engaging unit 221.

In this embodiment, there are a total of eight engaging units 221, where the engaging holes 222 of four of the engaging units 221 are arranged in an inner circle and the engaging holes 222 of the other four of the engaging units 221 are arranged in an outer circle as shown in FIG. 2. The design of the inner and outer circles allows flat panel displays 3 of two different brands or models to be used with the wall mount 2. Taking the engaging holes 222 arranged in the inner circle for illustration, the four engaging holes 222 labeled "1" constitute a single engaging unit 221, the four engaging holes 222 labeled "2" constitute another engaging unit 221, the four engaging holes 222 labeled "3" constitute yet another engaging unit 221, and the four engaging holes 222 labeled "4" constitute still another engaging unit 221.

As shown in FIGS. 3, 5, 6 and 7, because the user has the freedom to secure the flat panel display 3 to the supporting frame 22 at one of a variety of angular position as provided by the multiple engaging units 221, in order to accommodate this freedom and allow the alignment reference diagram 6 of the positioning device 400 to correspondingly present states corresponding to these different angular positions, in this embodiment, the alignment reference diagram 6 is rotatably connected to the wall mount reference diagram 4 at centers thereof so as to be rotatable relative to the wall mount reference diagram 4 about a Z-axis extending along a front-rear direction and perpendicular to the X- and Y-axes directions. The wall mount reference diagram 4 further has an angle scale 45 marked on the front side 42. The angle scale 45 has a plurality of angle gradations 451 adjacent to the outer edge 44 and respectively indicating different angles at which the flat panel display 3 may be assembled with the wall mount 2. The angle gradations 451 correspond in position to at least some of the engaging holes 222 in each engaging unit 221. Specifically, in this embodiment, the angle gradations 451 correspond in position respectively to the engaging holes 222 that are located on or above a line passing through the center of the wall mount reference diagram 4 and extending in the X-axis direction. Further, the alignment reference diagram 6 includes two alignment reference lines 66 that are marked on the front surface 61, that pass through the center of the alignment reference diagram 6, and that are perpendicular to and intersect with each other. Each of the alignment reference lines 66 may be aligned with a selected one of the angle gradations 451, thereby indicating a rotation angle of the alignment reference diagram 6 relative to the wall mount reference diagram 4. Through the design that the angle gradations 451 are provided at the outer edge 44 of the wall mount reference diagram 4, and that each of the alignment reference lines 66 of the alignment reference diagram 6 may be aligned with the selected one of the angle gradations 451, not only can the rotation angle of the alignment reference diagram 6 relative to the wall mount reference diagram 4 be clearly indicated, but the user may also be clearly aware of the angle change when rotating the alignment reference diagram 6 so as to conveniently and quickly reach the desired angle. It should be noted that, in design, there also may be one alignment reference line 66 for the alignment reference diagram 6.

In particular, the positioning device 400 further includes a pivot axle 7 which connects together the wall mount reference diagram 4 and the alignment reference diagram 6 and defines the Z-axis. In this embodiment, the pivot axle 7 is exemplified as a rivet. The pivot axle 7 includes an axle portion 71 and two stop end portions 72 formed respectively at a front end and a rear end of the axle portion 71. The axle portion 71 extends through a center hole 46 of the wall mount reference diagram 4 and a center hole 67 of the alignment reference diagram 6. The two stop end portions 72 respectively abut against the front side 42 of the wall mount reference diagram 4 and a rear surface 68 of the alignment reference diagram 6 opposite to the front surface 61, thereby preventing the alignment reference diagram 6 and the wall mount reference diagram 4 from separating from each other, and holding the alignment reference diagram 6 in a state where the front surface 61 thereof abuts against the rear side 43 of the wall mount reference diagram 4.

Figure 8:
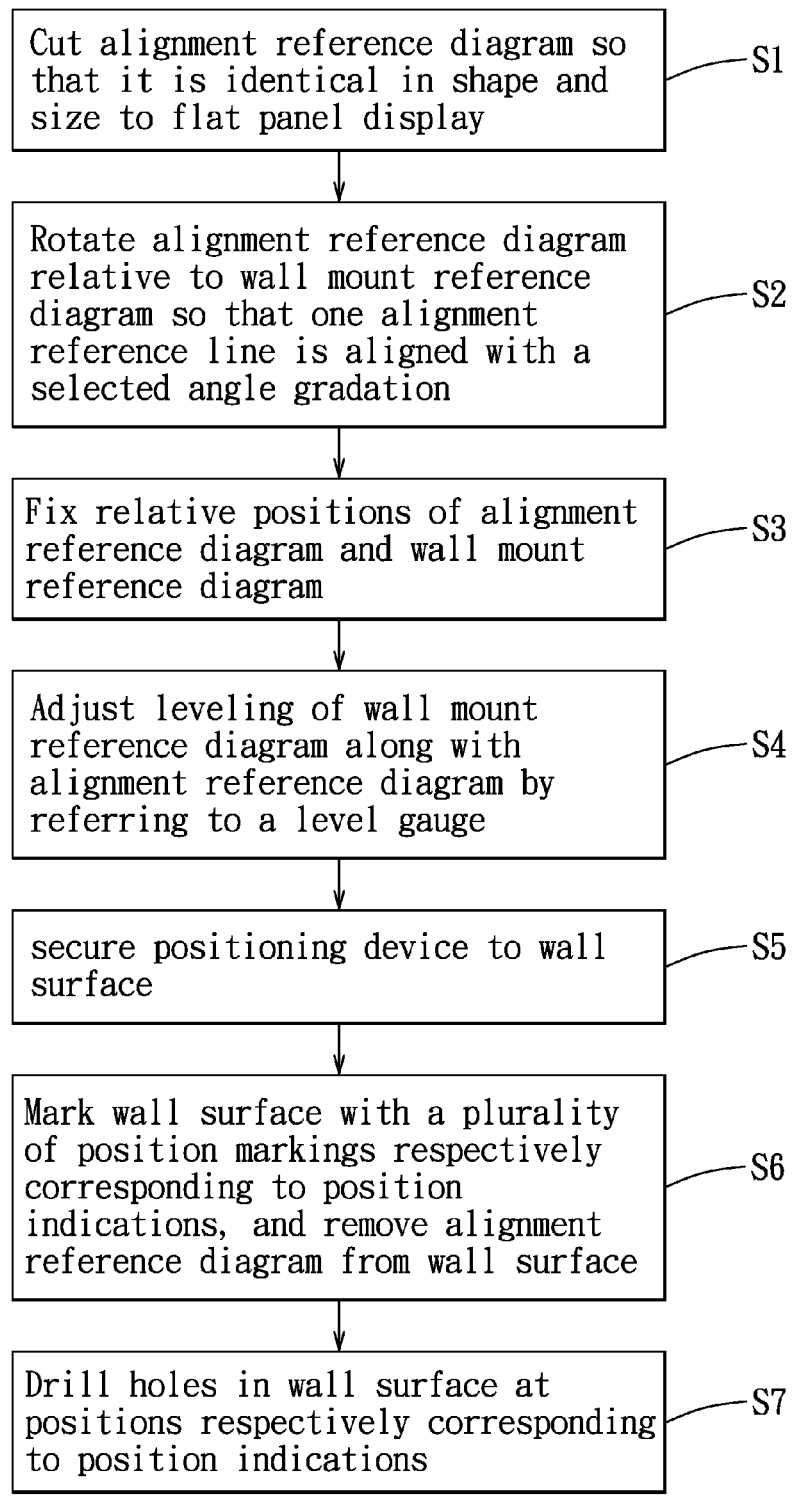
FIG. 8 is a flowchart of a positioning method according to the first embodiment of the present invention using the positioning device.

As shown in FIGS. 2, 4 and 8, a positioning method according to the first embodiment of the present invention will be described in detail. FIG. 8 is a flowchart of the positioning method carried out using the positioning device 400. The positioning method mainly includes the following steps.

In step S1, the alignment reference diagram 6 of the positioning device 400 is cut so that its length and width are respectively the same as those of the flat panel display 3 to be assembled with the wall mount 2, whose assembly position is to be confirmed and marked by the positioning device 400.

In step S2, the alignment reference diagram 6 is rotated relative to the wall mount reference diagram 4, which has position indications 41 respectively corresponding in position to the through holes 211 in the wall mount 2 to be mounted on the wall surface 1, so that the alignment reference line(s) 66 of the alignment reference diagram 6 is aligned with a selected one of the plurality of angle gradations 451 of the wall mount reference diagram 4 that respectively indicate different angles at which the flat panel display 3 may be assembled with the wall mount 2.

In step S3, relative positions of the alignment reference diagram 6 and the wall mount reference diagram 4 are fixed.

In step S4, leveling of the wall mount reference diagram 4 and the alignment reference diagram 6 relatively secured thereto is adjusted with the aid of the level tool 5.

In step S5, the positioning device 400 is fixed to the wall surface 1.

In step S6, the wall surface 1 is marked with the position markings 11 at locations respectively corresponding to the position indications 41 of the wall mount reference diagram 4, and then the positioning device 400 is removed from the wall surface 1.

In step S7, the wall surface 1 is drilled with multiple holes respectively at the position markings 11.

As shown in FIGS. 1, 4 and 8, before performing step S1, the dimensions, i.e., length and width, of the flat panel display 3 to be assembled to the wall mount 2 for hanging on the wall surface 1 needs to be determined. Then, in step S1, the alignment reference diagram 6 is cut, for example, by using scissors, with the aid of the length scales 64 and the width scales 65, so that the length (length of the long sides 62) and the width (length of the short sides 63) of the resultant alignment reference diagram 6 respectively match the length and width of the flat panel display 3. In cases where the original length and width of the alignment reference diagram 6 already match the length and width of the flat panel display 3, respectively, step S1 may be omitted.

Figure 9:
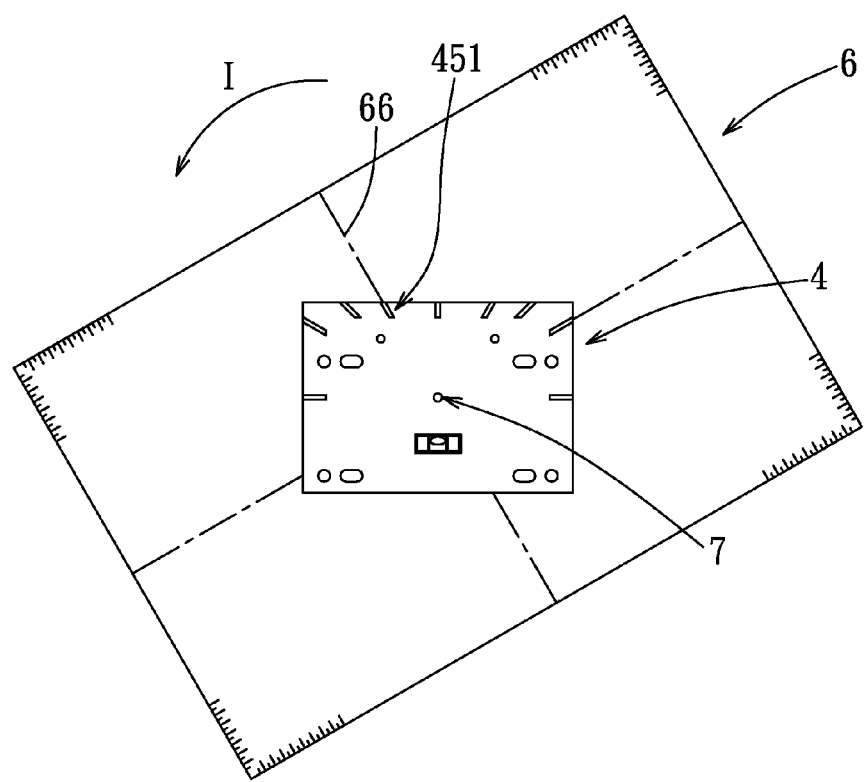
FIG. 9 is a front view of the positioning device, illustrating that the alignment reference diagram is rotated relative to the wall mount reference diagram.

As shown in FIGS. 8 and 9, to perform step S2, the alignment reference diagram 6 is rotated, for example, counter-clockwise as indicated by arrow (I) about the pivot axle 7 relative to the wall mount reference diagram 4 until one alignment reference line 66 of the alignment reference diagram 6 is aligned with a desired one of the angle gradations 451 in the wall mount reference diagram 4. It should be noted that, if the flat panel display 3 is to be hung on the wall mount 2 in a normal (leveled) state as shown in FIG. 6, step S2 may be omitted (assuming that initially, the alignment reference lines 66 are respectively aligned with the 0° and 90° angle gradations 451 (as shown in FIG. 5).

Figure 10:
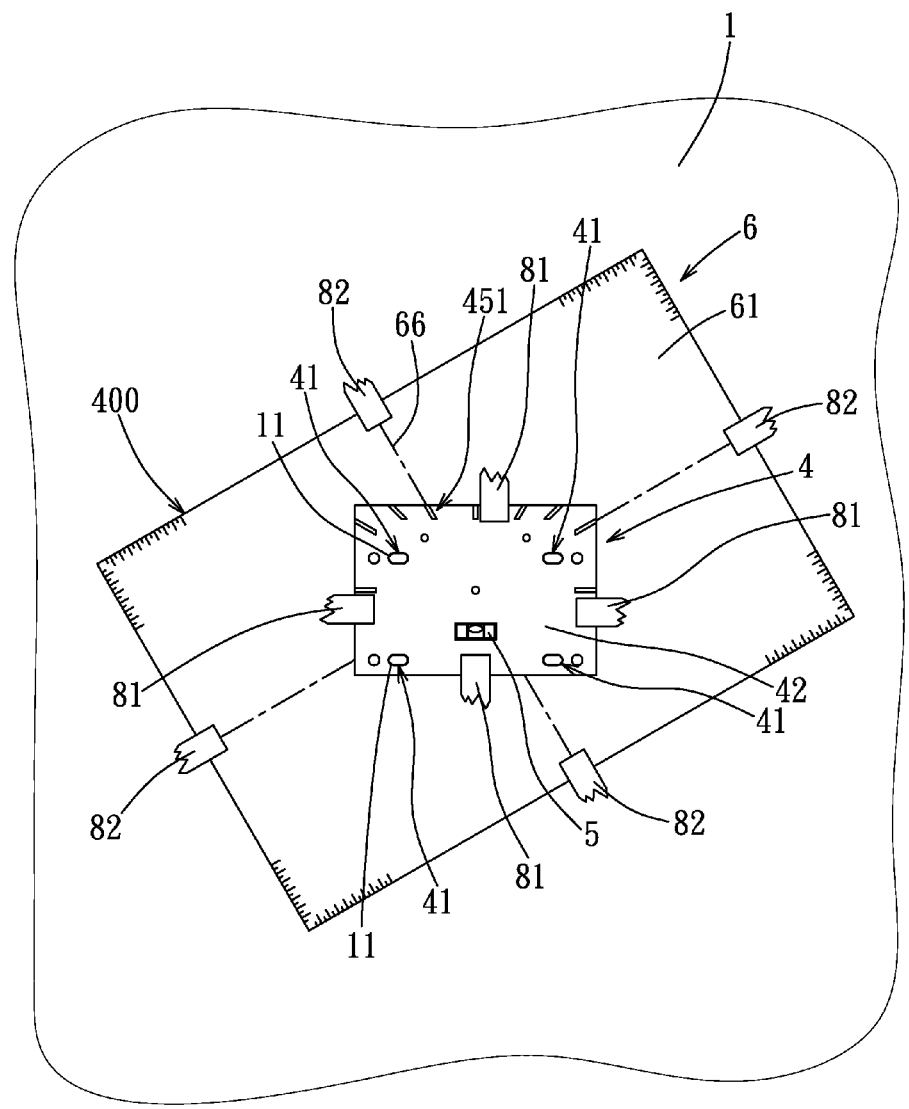
FIG. 10 is a front view of the positioning device, illustrating that adhesive tapes are used to secure relative positions between the wall mount reference diagram and the alignment reference diagram and between the positioning device and the wall surface.

As shown in FIGS. 8 and 10, to perform step S3, for example, multiple pieces of adhesive tapes 81 may be used to tape the front side 42 of the wall mount reference diagram 4 to the front surface 61 of the alignment reference diagram 6, so that the relative positions of the alignment reference diagram 6 and the wall mount reference diagram 4 are fixed, i.e., the alignment reference diagram 6 can no longer rotate relative to the wall mount reference diagram 4. As such, the alignment reference line 66 is prevented from departing from the desired angle gradation 451, and is ensured to remain aligned with the desired angle gradation 451.

Next, step S4 is performed. By adjusting the positions of the wall mount reference diagram 4 and the alignment reference diagram 6 fixed thereto by referring to the level tool 5, leveling of the position indications 41 of the wall mount reference diagram 4 may be corrected.

Then, to perform step S5, for example, multiple pieces of adhesive tapes 82 may be used to tape the front surface 61 of the alignment reference diagram 6 to the wall surface 1, so that the positioning device 400 is secured to the wall surface 1.

Subsequently, to perform step S6, portions of the alignment reference diagram 6 corresponding to the position indications 41 (in the form of through holes) are cut away by using, for example, a knife first, so that nothing is in the way between the position indications 41 and the wall surface 1, then the wall surface 1 is marked with a plurality of the position markings 11 at positions corresponding to the position indications 41 to have the same shape as the position indications 41 by using, for example, a pen, thereby indicating subsequent drilling locations, and then, the adhesive tapes 82 are removed from the wall surface 1 to allow for removal of the positioning device 400 from the wall surface 1.

As shown in FIGS. 8, 10 and 11, next, to perform step S7, a drilling machine (not shown) is used to drill into the wall surface 1 at locations marked with the position markings 11, so as to form a plurality of the fastening holes 12. It should be noted that, in practice, step S6 may be omitted, and the fastening holes 12 may be drilled into the wall surface 1 directly through the position indications 41 and the alignment reference diagram 6.

As shown in FIGS. 2, 12, 13 and 14, the wall-mounting frame 21 of the wall mount 2 is then brought against the wall surface 1 with the through holes 211 of the wall-mounting frame 21 respectively correspond in position to the fastening holes 12. Next, the wall-mounting frame 21 is mounted to the wall surface 1 by using the locking fasteners 23 that extend respectively through the through holes 211 of the wall-mounting frame 21 and that are screwed respectively into the fastening holes 12. Then, after mounting the flat panel display 3 to the supporting frame 22 at the desired angle corresponding to the selected one of the plurality of angle gradations 451, two engaging posts 212 of the wall-mounting frame 21 are respectively engaged in two positioning buckle holes 223 of the supporting frame 22, so that the supporting frame 22 along with the flat panel display 3 are assembled with the wall-mounting frame 21.

Figure 15:
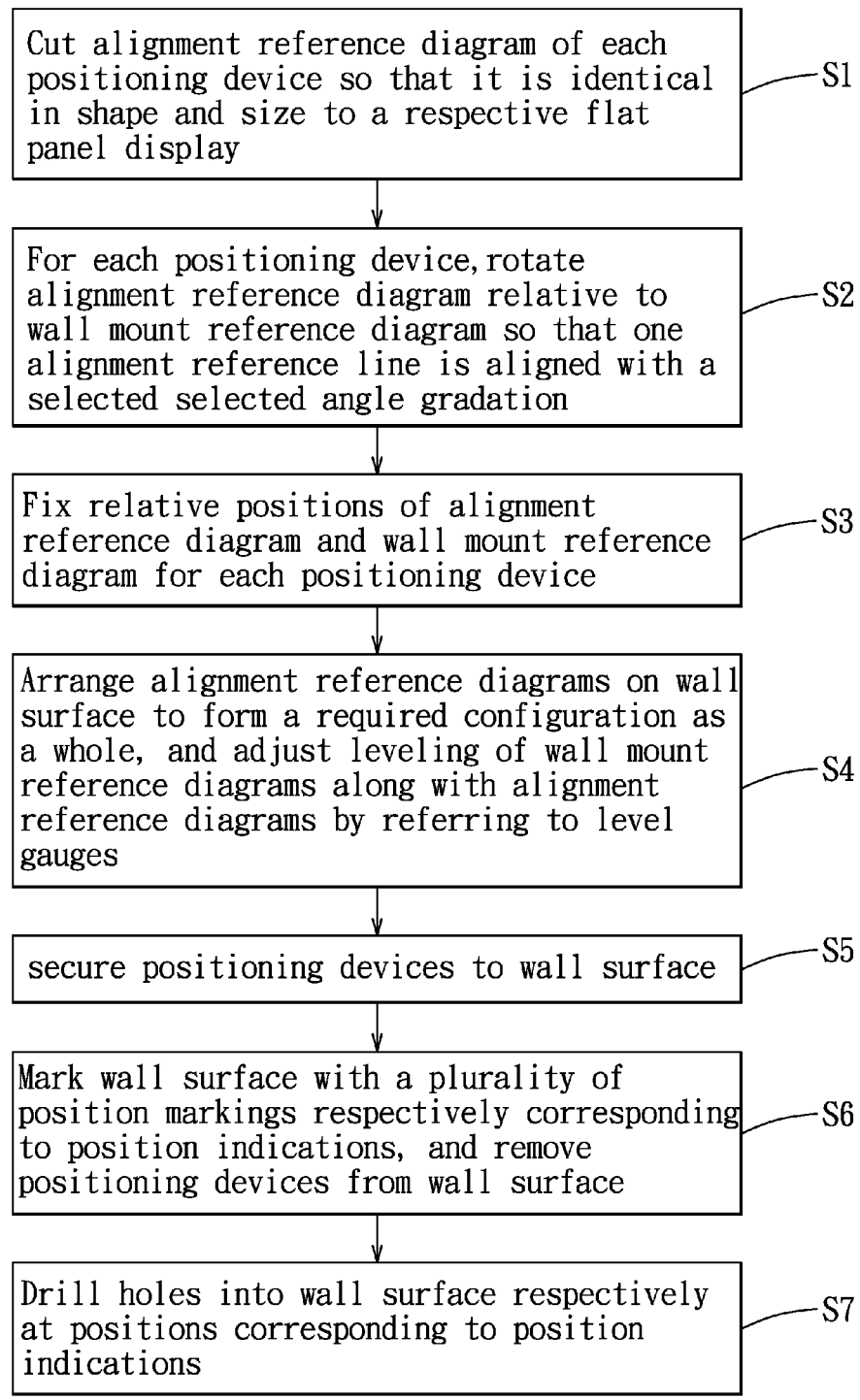
FIG. 15 is a flowchart of a positioning method according to the second embodiment of the present invention using a plurality of the positioning devices.
Figure 16:
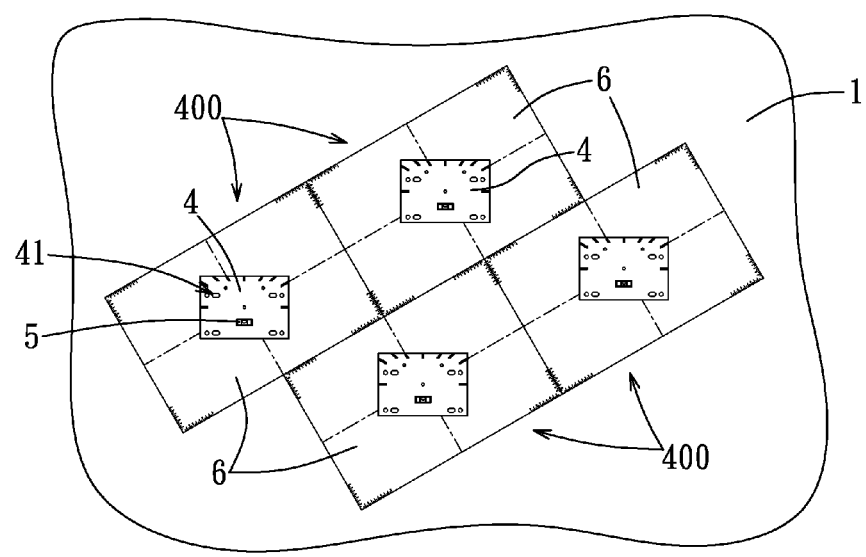
FIG. 16 is a schematic front view, illustrating that a configuration is formed on the wall surface with the alignment reference diagrams of the positioning devices.
Figure 17:
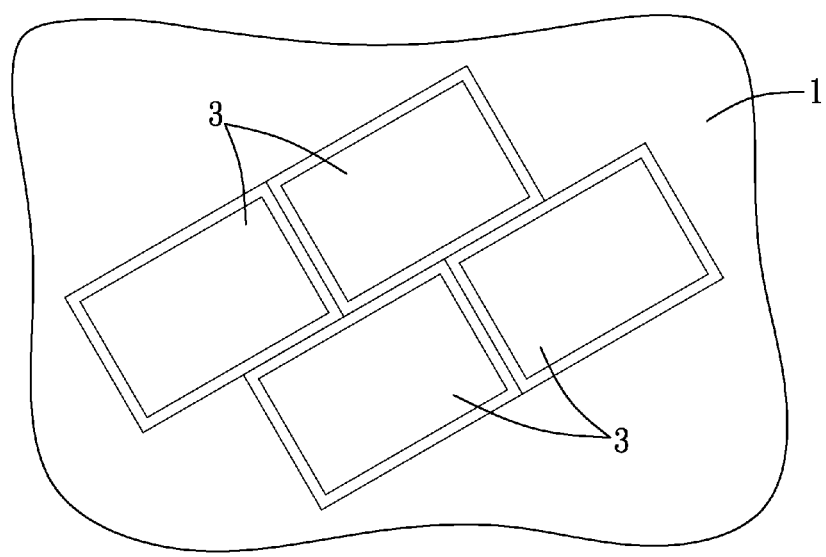
FIG. 17 is a schematic front view, illustrating a video wall formed by a plurality of flat panel displays according to the configuration shown in FIG. 16.

FIGS. 15, 16 and 17 illustrate a positioning method according to the second embodiment according to the present invention. This embodiment differs from the previous embodiment in that a plurality of positioning devices 400 are used to determine in advance assembly positions of a plurality of wall mounts 2 on the wall surface 1.

FIG. 15 is a flowchart of the positioning method of the second embodiment. The method mainly includes the following steps.

In step S1, the alignment reference diagram 6 of each of the positioning devices 400 is cut into the length and width of the respective flat panel display 3 to be assembled with a corresponding one of the plurality of wall mounts 2.

In step S2, the alignment reference diagram 6 of each positioning device 400 is rotated relative to the wall mount reference diagram 4 so that one alignment reference line 66 of the alignment reference diagram 6 is aligned with a selected one of the plurality of angle gradations 451 of the wall mount reference diagram 4.

In step S3, relative positions of the alignment reference diagram 6 and the wall mount reference diagram 4 of each positioning device 400 are fixed.

In step S4, the alignment reference diagram 6s of the positioning devices 400 are arranged on the wall surface 1 to form a required configuration as a whole, and leveling of the wall mount reference diagrams 4 along with the alignment reference diagram 6 relatively fixed thereto are adjusted with the assistance of the level tools 5 of the positioning devices 400.

In step S5, each positioning device 400 is secured to the wall surface 1.

In step S6, the wall surface 1 is marked with the position markings 11 respectively corresponding to the position indications 41 of the wall mount reference diagrams 4, and then the positioning devices 400 are removed from the wall surface 1.

In step S7, the wall surface 1 is drilled with holes respectively at the position markings 11.

Figure 18:
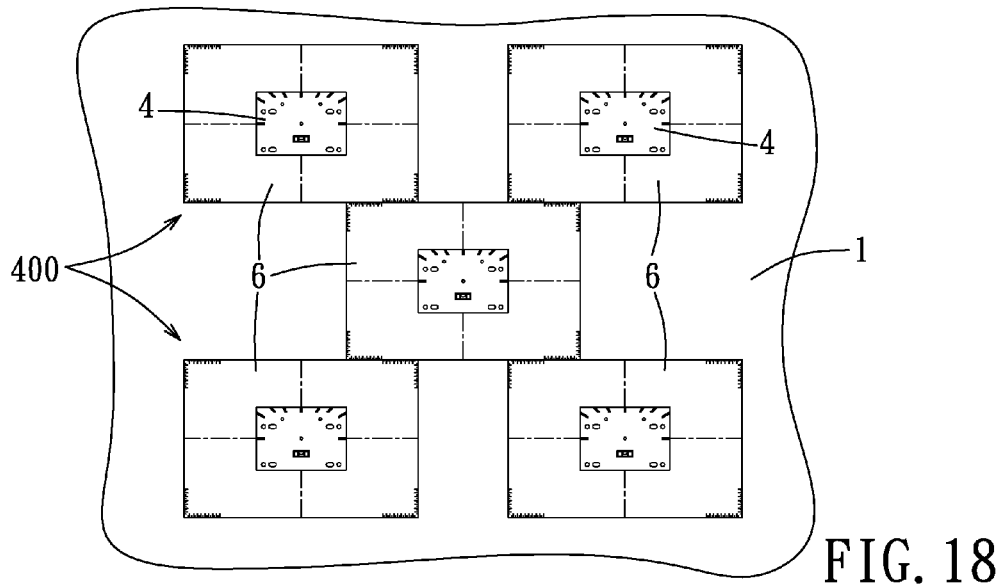
FIG. 18 is a schematic front view similar to FIG. 16, illustrating another configuration.
Figure 19:
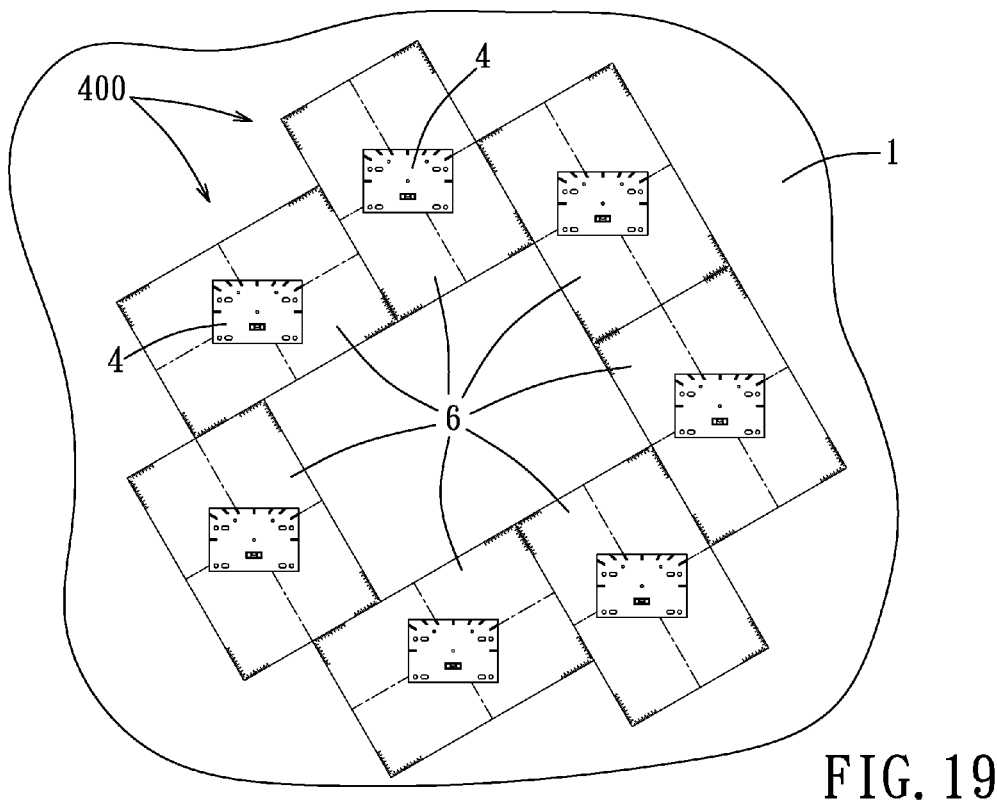
FIG. 19 is a schematic front view similar to FIG. 16, illustrating still another configuration.
Figure 20:
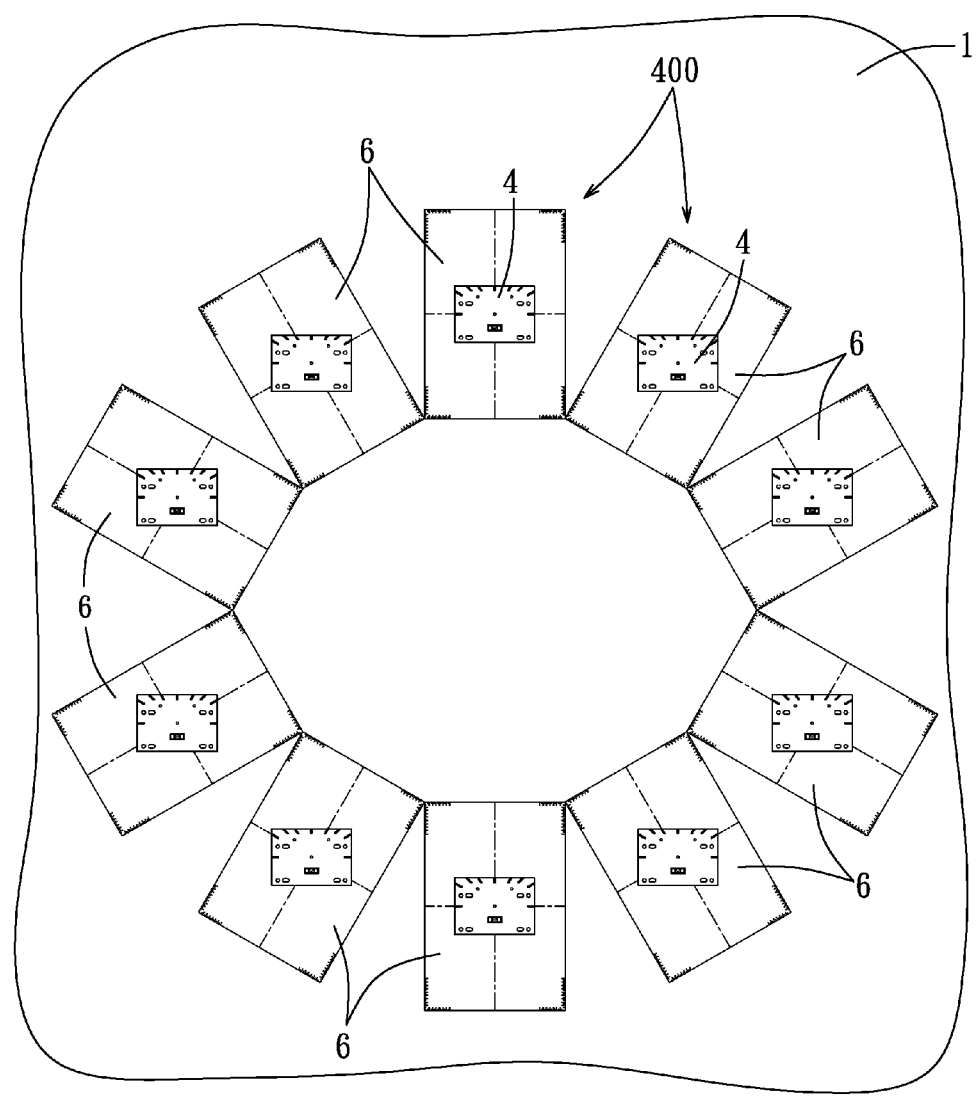
FIG. 20 is a schematic front view similar to FIG. 16, illustrating a further configuration.

In this embodiment, by viewing the overall configuration made by the alignment reference diagrams 6 of the positioning devices 400 on the wall surface 1 as shown in FIG. 16, the user is able to preview the overall shape and size of the video wall constituted by the flat panel displays 3 (as shown in FIG. 17) after assembly, as well as the effect presented thereby. In addition, with the assembly positions of the flat panel displays 3 confirmed and marked on the wall surface 1, the flat panel displays 3 may be mounted to the wall surface 1 to achieve the effect exactly corresponding to that of the preview as formed by the alignment reference diagrams 6. It should be mentioned that the alignment reference diagrams 6 of the positioning devices 400 may also form other configurations, such as those shown in FIGS. 18, 19 and 20, and the configuration is not limited to those disclosed herein.

To sum up, with the use of the wall mount reference diagram 4 and the level tool 5 of the positioning device 400 of the present invention, the assembly position of the wall mount 2 on the wall surface 1 can be determined in advance such that the wall mount 2 may be quickly and accurately mounted to the wall surface 1, thereby ensuring that the flat panel display 3 assembled to the wall mount 2 is leveled if the flat panel display 3 is to be disposed at a normal, upright position (as shown in FIG. 5). In addition, by providing the alignment reference diagram 6 rotatably connected to the wall mount reference diagram 4, the positioning device 400 of the present invention is able to provide the user with a preview how the flat panel display 3 would look on the wall surface 1 including the orientation and the actual space occupied thereby relative to the wall surface 1. In addition, multiple positioning devices 400 of the present invention may be used together to determine the assembly locations of multiple flat panel displays 3 that cooperatively constitute a video wall, and to demonstrate the overall effect achieved by the video wall. Hence, with the positioning device 400 of the present invention, the user may decide, prior to actual assembly of the wall mount(s) 2 and the flat panel display(s) 3, whether the size of individual flat panel display 3 and/or the overall orientation, number and shape of a video wall constituted by the flat panel displays 3 meet requirements, thereby providing the user an opportunity to make decision adjustments before actually mounting the wall mount (s) 2 and the flat panel display(s) 3 on the wall surface 1 and saving much time and effort. Thus, the objects of the present invention can surely be achieved.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A positioning device adapted to mark an assembly position of a wall mount on a wall surface, the wall mount being formed with a plurality of through holes, said positioning device comprising:
    a wall mount reference diagram that can be brought against the wall surface, and that is provided with a plurality of position indications, which are spaced apart from each other, and which respectively correspond in position to the through holes in the wall mount;
    a level tool that is disposed on said wall mount reference diagram, and that is configured to assist in correcting leveling of said position indications of said wall mount reference diagram; and
    an alignment reference diagram that is connected to and disposed behind said wall mount reference diagram, said alignment reference diagram having a size greater than that of said wall mount reference diagram, and being identical in shape and size to a flat panel that is to be assembled to the wall mount.

2. The positioning device of claim 1, wherein said alignment reference diagram is rectangular in shape and has a front surface, a long side, a short side that is connected to said long side, a length scale that is marked on said front surface along an extension direction of said long side, and a width scale that is marked on said front surface along an extension direction of said short side.

3. The positioning device of claim 1, wherein each of said wall mount reference diagram and said alignment reference diagram is one of a piece of drawing paper and a drawing board.

4. The positioning device of claim 1, wherein the center of said alignment reference diagram is rotatably connected to the center of said wall mount reference diagram so that said alignment reference diagram is rotatable relative to said wall mount reference diagram about an axis perpendicular to said wall mount reference diagram, said wall mount reference diagram having a front side that is opposite to said alignment reference diagram and an angle scale that is marked on said front side, said angle scale having a plurality of angle gradations that are adjacent to an outer edge of said wall mount reference diagram and that respectively indicate different angles at which the flat panel is capable of being assembled with the wall mount, said alignment reference diagram having a front surface that faces said wall mount reference diagram and an alignment reference line that is marked on said front surface and that is capable of being aligned with a selected one of said angle gradations.

5. The positioning device of claim 4, further comprising a pivot axle that rotatably connects said wall mount reference diagram to said alignment reference diagram and that defines said axis.

6. The positioning device of claim 4, wherein said alignment reference diagram is rectangular in shape and has a long side, a short side that is connected to said long side, a length scale that is marked on said front surface along an extension direction of said long side, and a width scale marked on said front surface along an extension direction of said short side.

7. A positioning method for determining in advance an assembly position of a wall mount on a wall surface, the wall mount being configured to be assembled with a flat panel, said positioning method comprising the steps of: (A) adjusting positions of a wall mount reference diagram and an alignment reference diagram that is connected to the wall mount reference diagram by referring to a level tool so that a plurality of position indications of the wall mount reference diagram are leveled, the position indications respectively corresponding in position to a plurality of through holes in the wall mount, the alignment reference diagram being identical in shape and size to the flat panel; (B) fixing the alignment reference diagram to the wall surface; and (C) drilling holes into the wall surface at locations respectively corresponding to the position indications, the holes indicating where the through holes of the wall mount are to be aligned when the wall mount is mounted to the wall surface, the alignment reference diagram being rotatably pivoted to the wall mount reference diagram, said positioning method further comprising, prior to step (A), the steps of:
(D) rotating the alignment reference diagram relative to the wall mount reference diagram so that an alignment reference line of the alignment reference diagram is aligned with a selected one of a plurality of angle gradations of the wall mount reference diagram that respectively indicate different angles at which the flat panel is capable of being assembled with the wall mount; and
(E) fixing relative positions of the alignment reference diagram and the wall mount reference diagram.

8. The positioning method of claim 7, wherein in step (B), the alignment reference diagram is fixed to the wall surface by using an adhesive tape, and in step (E), the wall mount reference diagram is fixed to the alignment reference diagram by using an adhesive tape.

9. The positioning method of claim 8, further comprising, prior to step (D), the step of: (F) cutting an original alignment reference diagram to result in the alignment reference diagram that is identical in shape and size to the flat panel.

10. The positioning method of claim 7, further comprising, between steps (B) and (C), the step of: (G) marking on the wall surface a plurality of position markings at positions that respectively correspond to the position indications of the wall mount reference diagram, and removing the wall mount reference diagram and the alignment reference diagram from the wall surface;
wherein in said step (C), the holes are drilled into the wall surface at locations that are marked with the position markings.

11. The positioning method of claim 7, wherein in said step (C), the holes are drilled through the position indications of the wall mount reference diagram and into the wall surface.

12. A positioning method for determining assembly positions of a plurality of wall mounts on a wall surface in advance by using a plurality of positioning devices, each of the wall mounts being configured to be assembled with a respective flat panel, each of the positioning devices including a wall mount reference diagram, an alignment reference diagram that is connected to the wall mount reference diagram, and a level tool that is disposed on the wall mount reference diagram, said positioning method comprising the steps of:
(A) arranging the alignment reference diagrams of the positioning devices on the wall surface to form a required configuration as a whole, and adjusting a position of the wall mount reference diagram of each of the positioning devices with reference to the level tool of the positioning device such that a plurality of position indications of the wall mount reference diagram are leveled, the position indications corresponding respectively in position to a plurality of through holes in the wall mount, the alignment reference diagram of each of the positioning devices being identical in shape and size to the respective flat panel that is to be assembled with a corresponding one of the wall mounts;
(B) fixing the positioning devices to the wall surface; and
(C) drilling holes into the wall surface at positions that respectively correspond to the position indications, the holes indicating where the through holes of the wall mounts are to be aligned when the wall mounts are mounted to the wall surface.

13. The positioning method of claim 12, the alignment reference diagram being rotatably connected to the wall mount reference diagram, said positioning method further comprising, prior to step (A), the steps of:
(D) for each positioning device, rotating the alignment reference diagram relative to the wall mount reference diagram so that an alignment reference line of the alignment reference diagram is aligned with a selected one of a plurality of angle gradations of the wall mount reference diagram that respectively indicate different angles at which the respective flat panel is capable of being assembled with the corresponding one of the wall mounts; and
(E) for each positioning device, fixing relative positions of the alignment reference diagram and the wall mount reference diagram.

14. The positioning method of claim 13, wherein in step (B), the positioning devices are fixed to the wall surface by using adhesive tapes, and in step (E), the wall mount reference diagram of each of the positioning devices is fixed to the alignment reference diagram of the positioning device by using an adhesive tape.

15. The positioning method of claim 14, further comprising, prior to step (D), the step of: (F) cutting an original alignment reference diagram of each of the positioning devices to result in the alignment reference diagram that is identical in shape and size to the respective flat panel.

16. The positioning method of claim 13, further comprising, between steps (B) and (C), the step of: (G) marking on the wall surface a plurality of position markings at positions that correspond respectively to the position indications of the wall mount reference diagrams, and removing the positioning devices from the wall surface;
wherein in step (C), the holes are drilled into the wall surface at locations that are marked with the position markings.

17. The positioning method of claim 13, wherein in said step (C), the holes are drilled through the position indications of the wall mount reference diagrams and into the wall surface.

* * * * *